(12) United States Patent
Hidaka et al.

(10) Patent No.: US 9,163,743 B2
(45) Date of Patent: Oct. 20, 2015

(54) PIEZOELECTRICALLY DRIVEN VALVE AND PIEZOELECTRICALLY DRIVEN FLOW RATE CONTROL DEVICE

(75) Inventors: Atsushi Hidaka, Osaka (JP); Kaoru Hirata, Osaka (JP); Masaaki Nagase, Osaka (JP); Nobukazu Ikeda, Osaka (JP); Ryousuke Dohi, Osaka (JP); Kouji Nishino, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 674 days.

(21) Appl. No.: 13/505,620

(22) PCT Filed: Nov. 4, 2010

(86) PCT No.: PCT/JP2010/006483
§ 371 (c)(1),
(2), (4) Date: Jul. 18, 2012

(87) PCT Pub. No.: WO2011/067891
PCT Pub. Date: Jun. 9, 2011

(65) Prior Publication Data
US 2012/0273061 A1 Nov. 1, 2012

(30) Foreign Application Priority Data

Dec. 1, 2009 (JP) ................................. 2009-274005

(51) Int. Cl.
*G05D 7/06* (2006.01)
*F16K 31/00* (2006.01)
(Continued)

(52) U.S. Cl.
CPC ................. *F16K 31/007* (2013.01); *F16K 7/14* (2013.01); *F16K 25/005* (2013.01);
(Continued)

(58) Field of Classification Search
CPC ....... G05D 7/0629; F16K 31/007; F16K 7/14; F16K 25/005; Y10T 137/6416; Y10T 137/7759; Y10T 137/776; Y10T 137/7761

USPC ....................................... 137/486, 487, 487.5
See application file for complete search history.

(56) References Cited

U.S. PATENT DOCUMENTS 4,284,263 A 8/1981 Newcomb
5,669,408 A 9/1997 Nishino et al.
(Continued)

FOREIGN PATENT DOCUMENTS

JP 54-147525 11/1979
JP 08-338546 12/1996
(Continued)

OTHER PUBLICATIONS

International Search Report completed on Nov. 17, 2010 and mailed on Nov. 30, 2010 in International Application No. PCT/JP2010/006483.

*Primary Examiner* — William McCalister
(74) *Attorney, Agent, or Firm* — Griffin & Szipl, P.C.

(57) ABSTRACT

A piezoelectrically driven valve and a piezoelectrically driven fluid control device are provided that may control a fluid even if the temperature of the fluid is higher than an operating temperature range of a piezoelectric actuator. The piezoelectrically driven valve includes a valve element for opening and closing a fluid passage, a piezoelectric actuator for driving the valve element by utilizing extension of a piezoelectric element, and a radiation spacer that lifts and supports the piezoelectric actuator away from the fluid passage, and radiates heat that is transferred from fluid flowing in the fluid passage to the piezoelectric actuator, and preferably further includes a support cylinder that houses and supports both of the piezoelectric actuator and the radiation spacer, wherein the support cylinder is made of a material with the same thermal expansion coefficient as that of the radiation spacer, at least at a portion for housing the radiation spacer.

13 Claims, 4 Drawing Sheets

(51) Int. Cl.
*F16K 7/14* (2006.01)
*F16K 25/00* (2006.01)

(52) U.S. Cl.
CPC ........ *G05D 7/0629* (2013.01); *Y10T 137/6416* (2015.04); *Y10T 137/776* (2015.04); *Y10T 137/7759* (2015.04); *Y10T 137/7761* (2015.04)

(56) References Cited

U.S. PATENT DOCUMENTS 8,181,932 B2 * 5/2012 Matsumoto et al. ..... 251/129.06
2008/0296523 A1 * 12/2008 Gianchandani et al. . 251/129.06
2010/0127196 A1 5/2010 Sawada et al.
2010/0294964 A1 11/2010 Matsumoto et al.

FOREIGN PATENT DOCUMENTS

| JP | 2000-205428 | 7/2000 |
| JP | 2004-162733 | 10/2004 |
| JP | 4113425 B2 | 7/2008 |
| JP | 4119109 B2 | 7/2008 |
| WO | 2007083439 A1 | 7/2007 |
| WO | 2008129783 A1 | 10/2008 |

* cited by examiner

PIEZOELECTRICALLY DRIVEN VALVE AND PIEZOELECTRICALLY DRIVEN FLOW RATE CONTROL DEVICE

This is a National Phase Application in the United States of International Patent Application No. PCT/JP2010/006483 filed Nov. 4, 2010, which claims priority on Japanese Patent Application No. 2009-274005, filed Dec. 1, 2009. The entire disclosures of the above patent applications are hereby incorporated by reference.

TECHNICAL FIELD

The present invention relates to a piezoelectrically driven valve and to a piezoelectrically driven flow rate control device including the piezoelectrically driven valve, which control a fluid flow rate by controlling opening/closing of a valve element by using a piezoelectric actuator.

BACKGROUND ART

Conventionally, a piezoelectrically driven valve and a piezoelectrically driven flow rate control device of this type are widely known (for example, see Japanese Patent No. 4119109 and Japanese Patent No. 4113425, etc.).

An example of a piezoelectrically driven flow rate control device, including a conventional piezoelectrically driven valve, is described hereinafter by referring to FIG. 2 to FIG. 6. In FIG. 2, the reference numeral 1 denotes a valve main body, the reference numeral 1a denotes a hole portion provided in the valve main body, the reference numeral 2 denotes a metal diaphragm valve element, the reference numeral 3 denotes a diaphragm presser, the reference numeral 4 denotes a presser adapter, the reference numeral 8a denotes a ball, the reference numeral 9 denotes a lower portion bearer, the reference numeral 10 denotes a piezoelectric actuator, the reference numeral 11 denotes an upper portion bearer, the reference numeral 12 denotes a positioning cap nut, the reference numeral 13 denotes a lock nut, the reference numeral 14 denotes a protective case, the reference numeral 15 denotes a connector, and the reference numeral 18 denotes an elastic member including stacked disc springs, the reference numeral 23 denotes a piezoelectric actuator support cylinder, the reference numeral 24 denotes a cylinder fixing/guide body, the reference numeral 25 denotes an O-ring, the reference numeral 26 denotes a split base, the reference numeral 27 denotes an attaching bolt, and the reference numeral 28 denotes a bearing.

In the example shown in FIG. 2, between the lower portion bearer 9 and the piezoelectric actuator 10, the ball 8a formed separately is interposed. However, it is also possible that a protrusion having a spherical tip end is formed integrally at the center of the lower end face of the piezoelectric actuator 10, and is used as the ball 8a and brought into contact with the lower portion bearer 9.

The valve main body 1 is made of stainless steel, and includes a hole portion 1a forming a part of a valve chamber, and a fluid inlet, a fluid outlet, a fluid passage, a valve chamber, and a valve seat, etc. The metal diaphragm valve element 2 is formed of a thin plate made of nickel-chromium alloy steel, and has an upturned dish shape whose central portion slightly swells upward. The metal diaphragm valve element 2 may have a tabular shape, and may be made of stainless steel, Inconel alloy, or other alloy steels. Furthermore, the metal diaphragm valve element 2 may use one diaphragm, or use layers of two or three diaphragms.

The metal diaphragm valve element 2 is disposed inside the valve chamber so as to be opposed to the valve seat, and by tightening the attaching bolt 27 into the valve main body 1 via the presser adapter 4, the split base 26, and the cylinder fixing/guide body 24, and the outer peripheral edge of the metal diaphragm valve element 2 are held and fixed airtightly to the valve main body 1 side. The presser adapter 4, the cylinder fixing/guide body 24, and the split base 26, etc., are made of metal such as stainless steel.

The piezoelectric actuator support cylinder 23 of the piezoelectric actuator (piezostack) 10 is formed into a cylindrical shape from Invar material with a small thermal expansion coefficient, and as shown in FIG. 3 and FIG. 4, an upper portion thereof is formed into a large-diameter portion 23c that houses the piezoelectric actuator 10, and a lower portion that is formed into a cylindrical reduced-diameter portion 23d that is reduced in diameter and houses the lower portion bearer 9 and the elastic member 18, etc. At the lowest end portion of the support cylinder 23, a cavity portion 23e in which the diaphragm presser 3 is fitted is formed, and here, the diaphragm presser 3 is inserted and fixed as shown in FIG. 2.

FIG. 3 is a longitudinal sectional view of the piezoelectric actuator support cylinder 23, and FIG. 4 is a sectional view taken along line I-I in FIG. 3. Near the boundary between the large-diameter portion 23c and the reduced-diameter portion 23d of the piezoelectric actuator support cylinder 23, a hole portion 23a, in which split base pieces 26a shown in FIG. 5 are inserted and combined from both sides so as to be opposed to each other, is formed by cutting both side portions of the outer wall portion to a fixed depth by a fixed length. Specifically, from both sides of the hole portion 23a, the split base pieces 26a that are half-split of the split base 26 (described later in more detail) are fitted so as to be opposed to each other, and integrally held and fixed as the split base 26 by the cylinder fixing/guide body 24. Before fitting the split base pieces 26a, the elastic member 18 is inserted and fitted to the bottom portion 23b of the reduced-diameter portion 23d as shown in FIG. 2.

FIG. 5 is a plan view showing a fitting state of the conventional split base 26, and FIG. 6 is a sectional view taken along line II-II in FIG. 5. As clearly seen in FIG. 5 and FIG. 6, the two split base pieces 26a are formed by half-splitting a short cylindrical body at the center portion, the short cylindrical body having an upper wall 26b and having a flange portion 26c formed on the lower end outer periphery and an insertion hole 26d and a fitting portion 26e formed on the upper wall 26b, and by fitting the split base pieces 26a to each other so as to be opposed to each other, the split base 26 is formed.

Specifically, as shown in FIG. 2 and FIG. 6, the flange portion 26c is subjected to a pressing force from the lower end of the cylinder fixing/guide body 24 and acts to press the presser adapter 4, and the insertion hole 26d allows the wall body of the reduced-diameter portion 23d of the piezoelectric actuator support cylinder 23 to be inserted through, and further, the fitting portion 26e is positioned between the lower portion bearer 9 and the wall body of the support cylinder 23 and acts to position the three members 9, 23, and 26.

The bearing 28 is formed of a bearing receiver 28a and small balls 28b, and is disposed above the upper portion bearer 11 and makes smooth turning of the positioning cap nut 12.

A control valve shown in FIG. 2 is mainly used as a control valve for a pressure type flow rate control device, so that, as shown in FIG. 2, the valve main body 1 is provided with an orifice mounting portion 30 including an orifice guide 30a, a gasket 30b, and an orifice 30c, etc., a pressure sensor mounting portion 31 including a pressure sensor 31a, a gasket 31b, a connector 31c, a presser flange 31d, and a fixing bolt 31e, etc., and a primary connecting portion 29 including a connection guide 29a and a gasket 29b, etc. The reference numeral 32 denotes a control circuit mounting plate for a piezoelectric actuator, etc., provided inside the protective case 14.

The pressure type flow rate control device, as a basic principle, adjusts an orifice upstream side pressure P1 by a control valve on the orifice upstream side in a state where the pressure P1 is kept approximately twice or more as high as the downstream side pressure P2, thereby controlling a flow rate Qc on the orifice downstream side to a set value by calculating Qc=KP1 (K=a constant), and is disclosed in Japanese Published Unexamined Patent Application No. H08-338546, etc.

To assemble the control valve, the metal diaphragm valve element 2, the presser adapter 4, the piezoelectric actuator support cylinder 23 to which the diaphragm presser 3 is fixed, the elastic member 18, the split base 26, and the lower portion bearer 9 are fitted in order into the hole portion 1a of the valve main body 1, and the piezoelectric actuator support cylinder 23 is inserted and fitted into the valve main body 1 via the cylinder fixing/guide body 24. Next, the ball 8a, the piezoelectric actuator 10, the upper portion bearer 11, and the bearing 28 are inserted and fitted in order into the piezoelectric actuator support cylinder 23, and an actuation stroke of the metal diaphragm valve element 2 by the piezoelectric actuator 10 is finely adjusted to a set value by adjusting the tightening amount of the positioning cap nut 12 forming a positioning member.

By tightening and fixing the cylinder fixing/guide body 24, as described above, the split base 26, the support cylinder 23, the lower portion bearer 9, the elastic member 18, the diaphragm presser 3, and the diaphragm valve element 2, etc., are automatically fixed to predetermined positions in an orderly manner, and by tightening the positioning member 12, the central axes of the ball 8a, the piezoelectric actuator 10, and the support cylinder 23, etc., are highly accurately aligned.

Referring to FIG. 2, when a valve opening signal is input (input voltage: 0 to 120V) from a control circuit (not illustrated) via the connector 15, the piezoelectric actuator 10 extends by a set value (e.g., 0 to 45 μm). Accordingly, a pushing-up force of approximately 40 to 80 kgf is applied to the piezoelectric actuator support cylinder 23, and the piezoelectric actuator support cylinder 23 moves up by the set value against an elastic force of the elastic member 18 while the central axis is held by the O-ring 25 of the cylinder fixing/guide body 24. As a result, the diaphragm valve element 2 separates from the valve seat due to the elastic force, thereby opening the valve.

On the contrary, when the valve opening input is turned off, the piezoelectric actuator 10 restores to the original length, and as a result, the bottom portion of the piezoelectric actuator support cylinder 23 is pushed down by the elastic force of the elastic member 18 and the metal diaphragm valve element 2 is seated on the valve seat by the diaphragm presser 3, thereby closing the valve.

When the valve opening stroke is 45 μm and the opening diameter of the valve seat is 1 mmϕ, an actuation time required for fully opening the valve from the fully-closed state is approximately 30 msec or less.

Problem to be Solved by the Invention

The piezoelectric actuator in the piezoelectrically driven valve is a so-called metal-sealed multilayer piezoelectric actuator, in which a multilayer piezoelectric element (also referred to as piezostack) is sealed in a metal case, and an allowable temperature range thereof is, for example, −20 to 120° C. Therefore, the temperature of a fluid to be controlled by the piezoelectrically driven valve is limited.

Therefore, a main object of the present invention is to provide a piezoelectrically driven valve and a piezoelectrically driven fluid control device that are capable of controlling a fluid even if the temperature of the fluid is higher than the allowable temperature range of the piezoelectric actuator.

Means for Solving the Problem

In order to achieve the above-described object, a piezoelectrically driven valve according to the present invention includes a valve element for opening and closing a fluid passage, a piezoelectric actuator for driving the valve element for opening/closing by utilizing extension of the piezoelectric element, a radiation spacer that lifts and supports the piezoelectric actuator away from the fluid passage, and radiates heat that is transferred from a fluid flowing in the fluid passage to the piezoelectric actuator. It is preferable that the piezoelectrically driven valve further includes a support cylinder that houses and supports both of the piezoelectric actuator and the radiation spacer, and the support cylinder is made of a material with the same thermal expansion coefficient as that of the radiation spacer at least at a portion for housing the radiation spacer.

Preferably, the support cylinder includes a first cylinder portion that houses the piezoelectric actuator and a second cylinder portion that houses the radiation spacer, and is configured so that the first cylinder portion and the second cylinder portion are joinable to each other so as to form a common housing space, and the second cylinder portion is made of a material with the same thermal expansion coefficient as that of the radiation spacer.

Preferably, the valve element is formed of a resilient self-restoring metal diaphragm, the support cylinder is supported movably up and down, and the valve element includes an elastic member that biases the support cylinder to make the valve element close the fluid passage, and a support portion that passes through the side wall of the support cylinder and extends to the lower portion of the radiation spacer, and supports the radiation spacer so as to lift the support cylinder against an elastic force of the elastic member to make the valve element open the fluid passage when the piezoelectric actuator extends.

The radiation spacer is preferably made of Invar material. The radiation spacer preferably has the same shape and size as those of the piezoelectric actuator. Preferably, the length between the lower end portion and the upper end portion of the radiation spacer is set so that the temperature at the upper end portion becomes a temperature not higher than a heat-proof temperature of the piezoelectric actuator due to radiation during transfer of heat applied from a fluid flowing in the fluid passage from the lower end portion to the upper end portion of the radiation spacer.

In order to achieve the above-described object, a piezoelectrically driven flow rate control device according to the present invention includes the above-described piezoelectrically driven valve according to the present invention. The piezoelectrically driven flow rate control device according to the present invention preferably further includes an orifice interposed in the fluid passage on the downstream side of the valve element, a pressure sensor disposed in the fluid passage between the orifice and the valve element, and a control unit that controls the piezoelectric actuator based on a detected value detected by the pressure sensor.

The piezoelectrically driven flow rate control device according to the present invention may be configured to control the piezoelectric actuator based on a detected value detected by a thermal type flow sensor disposed on the upstream side of the valve element.

SUMMARY OF THE INVENTION

More specifically, in accordance with a first embodiment of the present invention, a piezoelectrically driven valve is provided that includes: (a) a valve element for opening and closing a fluid passage; (b) a piezoelectric actuator for driving the valve element for opening/closing by utilizing extension of the piezoelectric element; and (c) a radiation spacer that lifts and supports the piezoelectric actuator away from the fluid passage, and radiates heat that is transferred from a fluid flowing in the fluid passage to the piezoelectric actuator. In accordance with a second embodiment of the present invention, the first embodiment is modified so that it also includes (d) a support cylinder that houses and supports both of the piezoelectric actuator and the radiation spacer, wherein the support cylinder is made of a material with the same thermal expansion coefficient as that of the radiation spacer at least at a portion for housing the radiation spacer. In accordance with a third embodiment of the present invention, the second embodiment is further modified so that the support cylinder includes a first cylinder portion that houses the piezoelectric actuator and a second cylinder portion that houses the radiation spacer, and is configured so that the first cylinder portion and the second cylinder portion are joinable to each other so as to form a common housing space, and the second cylinder portion is made of a material with the same thermal expansion coefficient as that of the radiation spacer. In accordance with a fourth embodiment of the present invention, the second embodiment is further modified so that the valve element is formed of a resilient self-restoring metal diaphragm, the support cylinder is supported movably up and down, and the valve element includes an elastic member that biases the support cylinder to make the valve element close the fluid passage, and a support portion that passes through the side wall of the support cylinder and extends to the lower portion of the radiation spacer, and supports the radiation spacer so as to lift the support cylinder against an elastic force of the elastic member to make the valve element open the fluid passage when the piezoelectric actuator extends.

In accordance with a fifth embodiment of the present invention, the first embodiment is modified so that the radiation spacer is made of Invar material. In accordance with a sixth embodiment of the present invention, the first embodiment is modified so that the radiation spacer has the same shape and size as those of the piezoelectric actuator. In accordance with a seventh embodiment of the present invention, the first embodiment is modified so that the length between the lower end portion and the upper end portion of the radiation spacer is set so that the temperature at the upper end portion becomes a temperature not higher than a heatproof temperature of the piezoelectric actuator due to radiation during transfer of heat applied from a fluid flowing in the fluid passage from the lower end portion to the upper end portion of the radiation spacer.

In accordance with an eighth embodiment of the present invention, a piezoelectrically driven flow rate control device is provided that includes the piezoelectrically driven valve according to any of the first embodiment, the second embodiment, the third embodiment, the fourth embodiment, the fifth embodiment, the sixth embodiment and the seventh embodiment. In accordance with an ninth embodiment of the present invention, the eighth embodiment is further modified so that it also includes an orifice interposed in the fluid passage on the downstream side of the valve element; a pressure sensor disposed in the fluid passage between the orifice and the valve element; and a control unit that controls the piezoelectric actuator based on a detected value detected by the pressure sensor. In accordance with a tenth embodiment of the present invention, the eighth embodiment is further modified so that the piezoelectrically driven flow rate control device controls the piezoelectric actuator based on a detected value detected by a thermal type flow sensor disposed on the upstream side of the valve element.

Thus, the present invention provides a piezoelectrically driven valve and a piezoelectrically driven fluid control device that are capable of controlling a fluid even if the temperature of the fluid is higher than an operating temperature range of a piezoelectric actuator of these devices. In accordance with a preferred, but non-limiting embodiment of the invention, a piezoelectrically driven valve includes a valve element 2 for opening and closing a fluid passage 1b, a piezoelectric actuator 10 for driving the valve element 2 for opening/closing by utilizing extension of a piezoelectric element, and a radiation spacer 40 that lifts and supports the piezoelectric actuator 10 away from the fluid passage 1b, and radiates heat that is transferred from a fluid flowing in the fluid passage 1b to the piezoelectric actuator 10, and preferably further includes a support cylinder 23A that houses and supports both of the piezoelectric actuator 10 and the radiation spacer 40, wherein the support cylinder 23A is made of a material with the same thermal expansion coefficient as that of the radiation spacer 40, at least at a portion for housing the radiation spacer 40.

Figure 1:
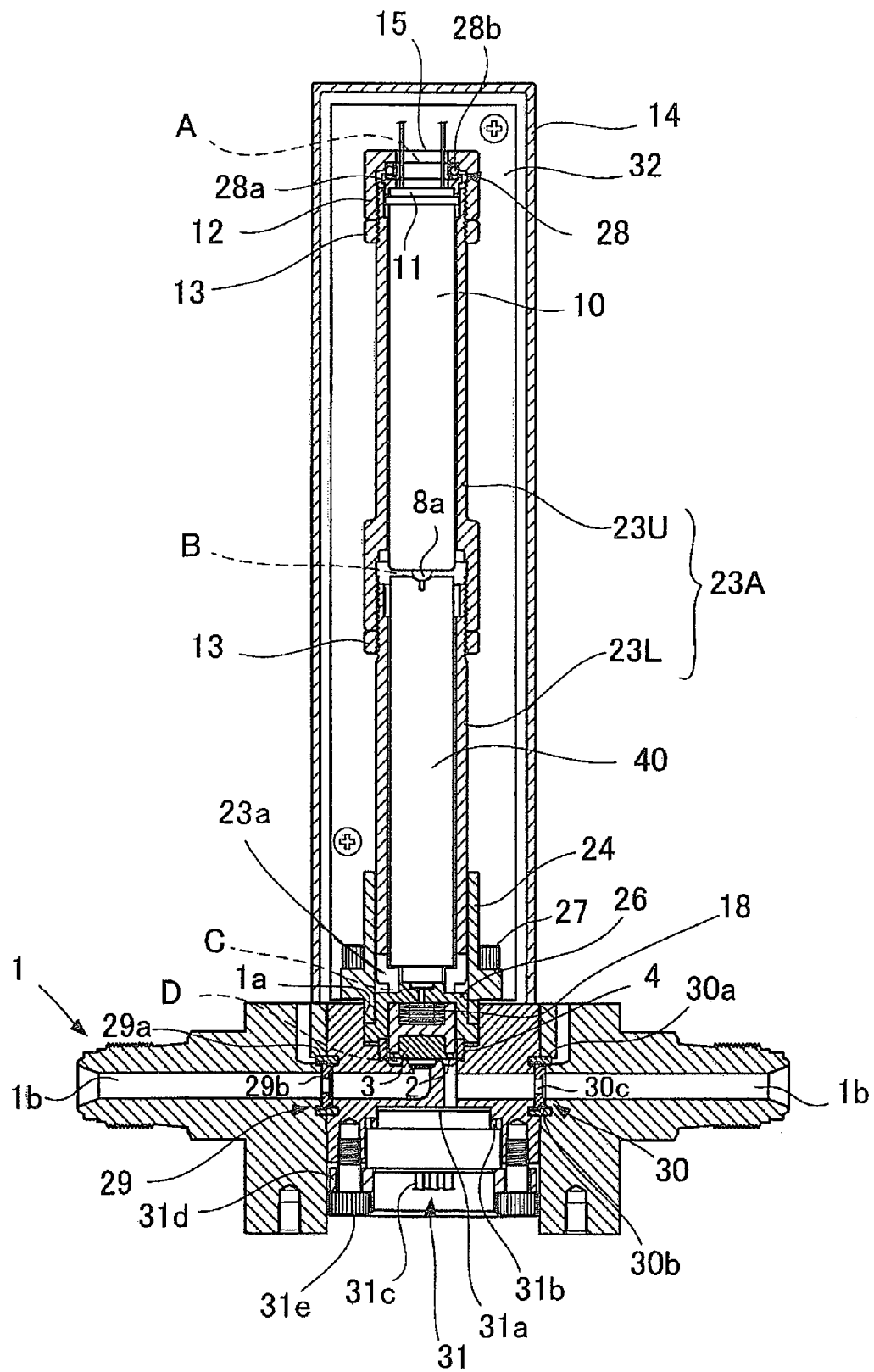
FIG. 1 is a central longitudinal sectional view showing an embodiment of a piezoelectrically driven flow rate control device according to the present invention.

DETAILED DESCRIPTION OF THE INVENTION
(Mode for Carrying Out the Invention)

Hereinafter, an embodiment of a piezoelectrically driven flow rate control device including a piezoelectrically driven valve, according to the present invention, is described with reference to FIG. 1. In the following description, components identical to or similar to those of the conventional piezoelectrically driven flow rate control device described with reference to FIG. 2 to FIG. 6 are provided with the same reference numerals, and overlapping or redundant description may be omitted.

The piezoelectrically driven flow rate control device 1 includes, as shown in FIG. 1, a valve element 2 for opening and closing a fluid passage 1b, a piezoelectric actuator 10 for driving the valve element 2 for opening/closing, and a radiation spacer 40 that lifts and supports the piezoelectric actuator 10 away from the fluid passage 1b, and radiates heat that is transferred from a fluid flowing in the fluid passage 1b to the piezoelectric actuator 10.

The piezoelectrically driven flow rate control device may further include a support cylinder 23A that houses and supports both of the piezoelectric actuator 10 and the radiation spacer 40, and the support cylinder 23A is made of the same material as that of the radiation spacer 40, at least at a portion for housing the radiation spacer 40.

As the valve element 2, in the illustrated example, a resilient self-restoring metal diaphragm is adopted. The metal diaphragm is formed of a thin plate made of nickel-chromium alloy steel, etc., and has an upturned dish shape whose central portion slightly swells upward as in the conventional example.

As the piezoelectric actuator 10, a metal-sealed multilayer piezoelectric actuator formed by sealing a piezostack including a multilayer piezoelectric element in a metal container can be used. One of this type of metal-sealed multilayer piezoelectric actuator is marketed by Nihon Ceratec Co., Ltd., and is suitable for use as the piezoelectric actuator 10.

The support cylinder 23A includes, as shown in the illustrated example, a first cylinder portion 23U that houses the piezoelectric actuator 10 and a second cylinder portion 23L that houses the radiation spacer 40, and can be configured so that the first cylinder portion 23U and the second cylinder portion 23L are joinable to each other so as to form a common housing space. In the illustrated example, the first cylinder portion 23U and the second cylinder portion 23L are screw-coupled to each other. In the illustrated example, the second cylinder portion 23L has the same shape as that of the conventional piezoelectric actuator support cylinder 23 shown in FIG. 2, and the conventional piezoelectric actuator support cylinder 23 can also be utilized. In the support cylinder 23A, the first cylinder portion 23U and the second cylinder portion 23L may be integral with each other instead of being separate as in the illustrated example.

The second cylinder portion 23L is made of the same material as that of the radiation spacer 40. The second cylinder portion 23L is preferably made of a material with a small thermal expansion coefficient (preferably, $2 \times 10^{-6}$/K or less) like Invar-material such as Invar, Super Invar, and stainless Invar. The first cylinder portion 23U is also preferably made of a material with a small thermal expansion coefficient, and may be made of the same material as that of the second cylinder portion 23L. In terms of radiation efficiency, the radiation spacer 40 is preferably made of a high thermal conductive material such as metal and alloy, and in this regard, the Invar material is suitable.

The length (height) of the radiation spacer 40 is set so that the radiation spacer makes the temperature at the upper end portion of the radiation spacer 40, that is, in the illustrated example, at a portion at which the radiation spacer 40 and the piezoelectric actuator 10 are in contact with each other, not higher than a heatproof temperature of the piezoelectric actuator 10 by radiating heat applied from the fluid flowing in the fluid passage 1b during transfer of the heat from the lower end portion to the upper end portion of the radiation spacer 40.

Preferably, the radiation spacer 40 is formed into a columnar shape with the same height and diameter as those of the piezoelectric actuator 10 as shown in the illustrated example. Accordingly, as the second cylinder portion 23L, the piezoelectric actuator support cylinder that is conventionally used for housing the piezoelectric actuator 10 can be used as it is. A portion of the illustrated radiation spacer 40 corresponding to the conventional lower portion bearer 9 shown in FIG. 2 is formed integrally with the lower portion of the radiation spacer 40.

The support cylinder 23A is supported movably up and down. The upper wall 26b of the split base 26 passes through the hole portion 23a formed in the side wall lower portion of the support cylinder 23A and extends to the lower portion of the radiation spacer 40 to form a support portion that supports the radiation spacer 40. In the illustrated example, the elastic member 18 is housed in the lower portion of the upper wall 26b of the split base 26 forming the support portion. Therefore, due to resistance from the upper wall 26b of the split base 26 forming the support portion, the elastic member 18 biases the support cylinder 23A downward in FIG. 1 to make the valve element 2 close the fluid passage 1b. On the other hand, the piezoelectric actuator 10 extends according to energization, and lifts the support cylinder 23A up against an elastic force of the elastic member 18 due to resistance from the upper wall 26b of the split base 26 forming the support portion and the radiation spacer 40 supported by the upper wall 26b. When the support cylinder 23A is lifted up, the metal diaphragm that forms the valve element 2 resiliently restores and opens the fluid passage 1b.

Figure 2:
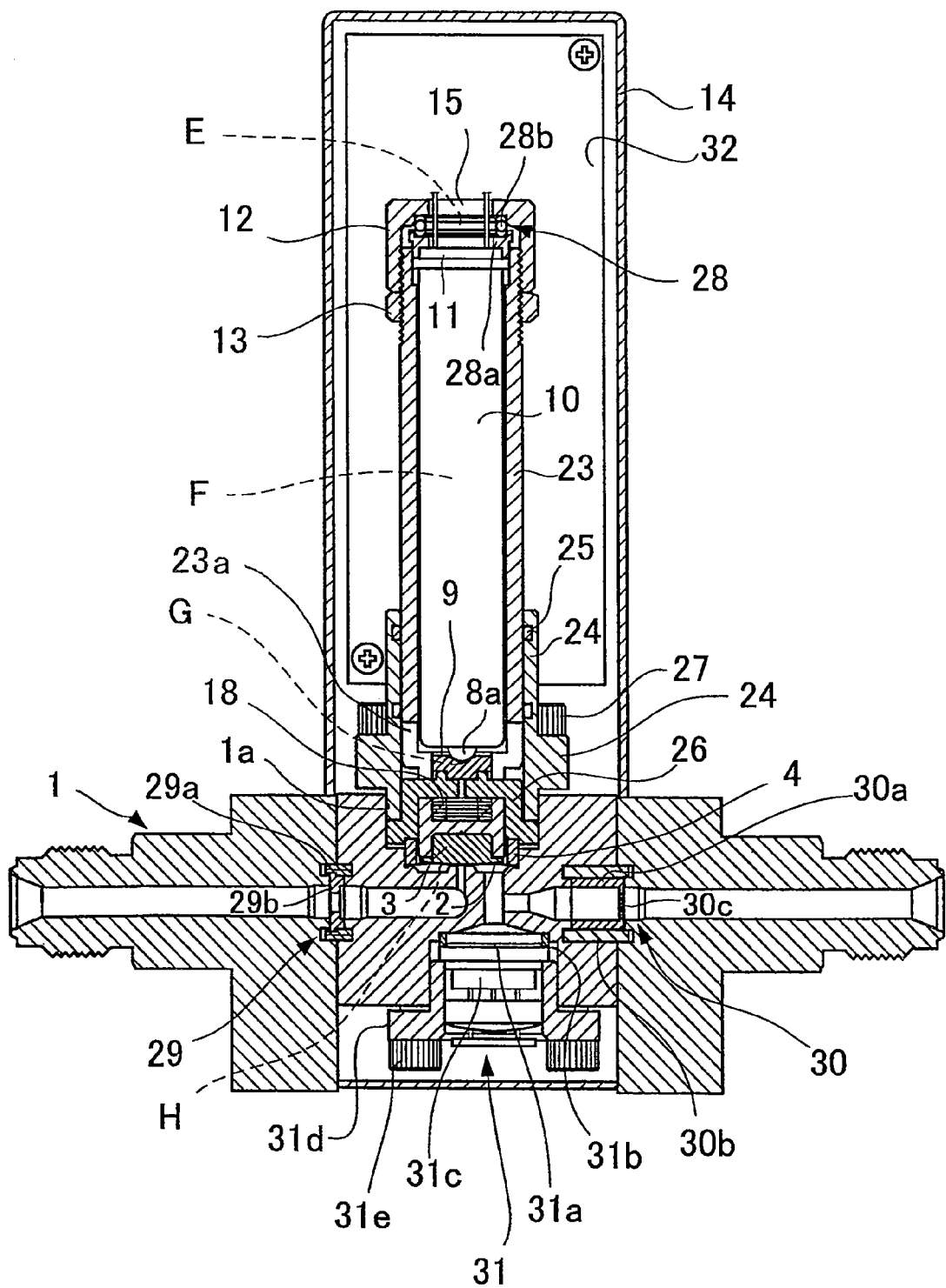
FIG. 2 is a longitudinal sectional view of a conventional piezoelectrically driven flow rate control device.
Figure 3:
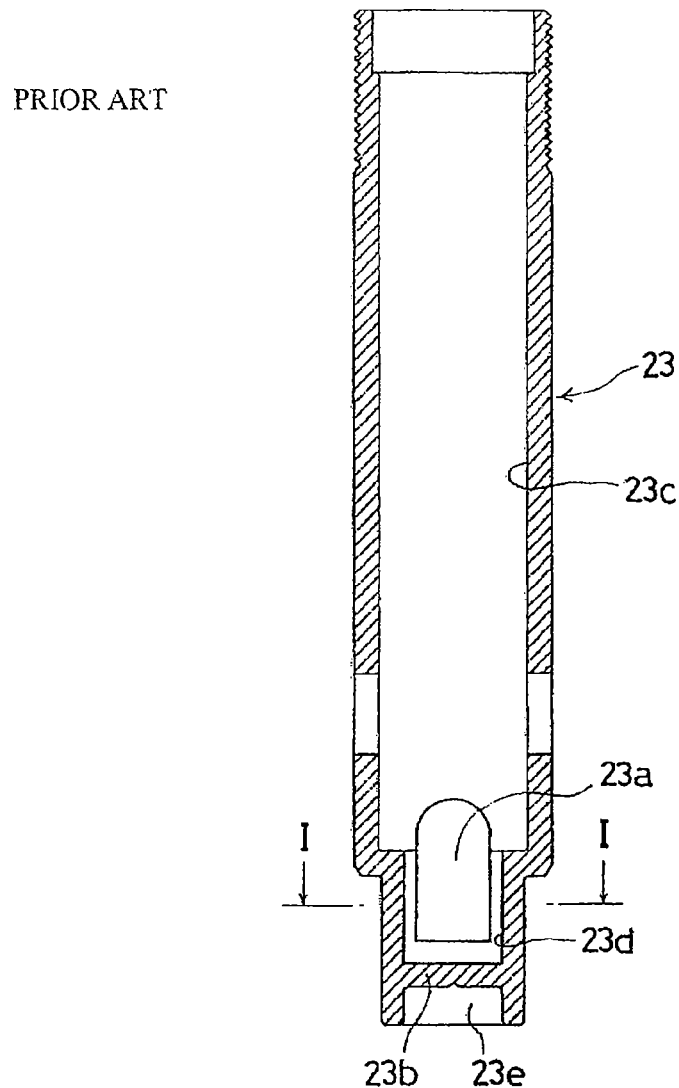
FIG. 3 is a longitudinal sectional view showing a support cylinder that is a component of the piezoelectrically driven flow rate control device shown in FIG. 2.
Figure 4:
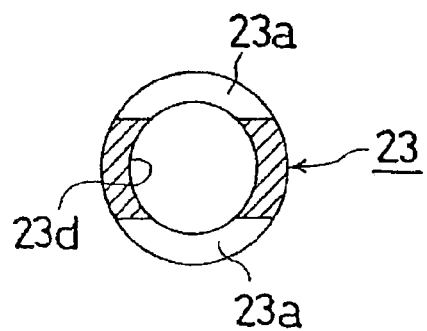
FIG. 4 is a sectional view taken along line I-I in FIG. 3.
Figure 5:
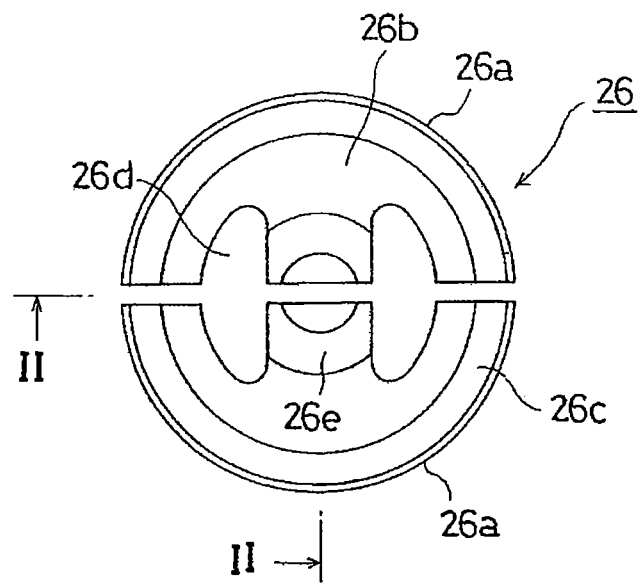
FIG. 5 is a plan view showing a component of the piezoelectrically driven flow rate control device in an enlarged manner.
Figure 6:
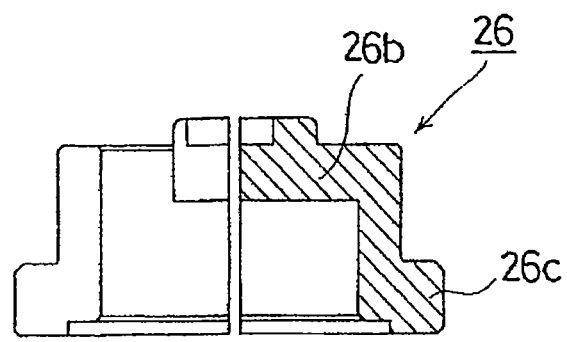
FIG. 6 is a sectional view taken along line II-II in FIG. 5.

As in the conventional device shown in FIG. 2, the orifice 30c is also interposed in the fluid passage 1b on the downstream side of the valve element 2 in the example of the device according to the present invention shown in FIG. 1. The pressure sensor 31a is disposed in the fluid passage 1b between the orifice 30c and the valve element 2. A control unit (not illustrated) provided outside the piezoelectrically driven flow rate control device controls the piezoelectric actuator 10 based on a detected value detected by the pressure sensor 31a. The control unit not illustrated controls the piezoelectric actuator 10 so as to obtain a predetermined set value of the flow rate Qc on the orifice downstream side by calculating Qc=KP1 (K=a constant) by adjusting an orifice upstream side pressure P1 (detected value detected by the pressure sensor 31a) by the control valve (valve element 2 to be controlled) on the orifice upstream side in a state where, for example, the pressure P1 is kept approximately twice or more as high as the orifice downstream side pressure P2 (detected value detected by a pressure detector not illustrated).

In the piezoelectrically driven flow rate control device configured as described above, the radiation spacer 40 lifts and supports the piezoelectric actuator 10, so that the piezoelectric actuator 10 is disposed on a drive path for driving the valve element 2 for opening/closing. Specifically, the radiation spacer 40 forms an extension structure that substantially extends the length in the extending direction of the piezoelectric actuator 10, that is, in the piezoelectric element stacking direction.

The radiation spacer supports the piezoelectric actuator 10 at a lifted-up position so as to separate the piezoelectric actuator 10 away from the fluid passage 1b, so that a part of heat of a high-temperature fluid flowing in the fluid passage 1b is radiated by the radiation spacer 40 before it can be transferred to the piezoelectric actuator 10. As a result, even if the temperature of the fluid flowing in the fluid passage 1b is higher than the allowable temperature range of the piezoelectric actuator, the temperature of the piezoelectric actuator 10 can be kept within the allowable temperature range (i.e., at a temperature that is not higher than a heatproof temperature of the piezoelectric actuator 10). Therefore, the radiation spacer 40 operates to thermally separate the piezoelectric actuator 10 away from the fluid passage that becomes a heat source while securing opening/closing driving of the valve element 2 by the piezoelectric actuator 10.

Furthermore, the support cylinder 23A housing and supporting the radiation spacer 40 and the piezoelectric actuator 10 is made of the same material as that of the radiation spacer 40, at least at the portion housing the radiation spacer 40, so that thermal elongation of the radiation spacer 40 and thermal elongation of the support cylinder 23A at the portion surrounding the radiation spacer 40 can be made equal to or substantially equal to each other. As a result, even when controlling the valve lift that is minute, for example, 50 μm or less, accurate control is realized without interference due to thermal elongation by either the support cylinder 23A or the radiation spacer 40.

Next, results of an experiment of measurement of temperature drops, as an example, are shown in Table 1. The piezoelectrically driven flow rate control device used in the experiment has the same structure as shown in FIG. 1. The piezoelectric actuator used is the metal-sealed multilayer piezoelectric actuator PRB3060 manufactured by Nihon Ceratec Co., Ltd., and its diameter is 13 mm, height is 47.4 mm, and operating temperature range described in the specifications is −20 to 120° C. The radiation spacer used is made of Invar (Fe-36% Ni). Both of the upper cylinder portion and the lower cylinder portion of the support cylinder are also made of Invar (Fe-36% Ni). The elastic member (disc springs) is made of SUS631. The temperature of the fluid flowing in the fluid passage was adjusted to 250° C., and temperature measuring points A to D shown in FIG. 1 were measured with a thermocouple thermometer.

TABLE 1

| Measuring point | Measured temperature (with 250° C. setting) |
| --- | --- |
| Point A (upper portion of piezoelectric actuator) | 58° C. |
| Point B (lower portion of piezoelectric actuator) | 90° C. |
| Point C (lower portion of radiation spacer) | 235° C. |
| Point D (metal diaphragm portion) | 250° C. |

The results shown in Table 1 show that the temperature at the lower portion of the piezoelectric actuator is much lower than the temperature at the metal diaphragm portion. Specifically, even when the temperature of the fluid to be controlled is 250° C., the temperature at the lower portion of the piezoelectric actuator is 90° C., and it is within the guaranteed operating temperature range.

Next, as a comparative example, results of a temperature drop measurement test conducted in the same manner by measuring the measuring points E to H shown in FIG. 2 of the conventional piezoelectrically driven flow rate control device shown in FIG. 2 are shown in Table 2 below. In the experiment device used in the comparative example, the same metal-sealed multilayer piezoelectric actuator as in the example above was used, and the constituent materials used were also the same as in the example. The temperature of the fluid flowing in the fluid passage was set to 150° C.

TABLE 2

| Measuring point | Measured temperature (with 150° C. setting) |
| --- | --- |
| Point E (upper portion of piezoelectric actuator) | 65° C. |
| Point F (middle portion of piezoelectric actuator) | 78° C. |

TABLE 2-continued

| Measuring point | Measured temperature (with 150° C. setting) |
| --- | --- |
| Point G (lower portion of piezoelectric actuator) | 130° C. |
| Point H (metal diaphragm portion) | 150° C. |

The results shown in Table 2 above show that the temperature at the lower portion of the piezoelectric actuator is not significantly lower than the fluid temperature (150° C.). In the comparative example, when the temperature of the fluid to be controlled is 150° C., the temperature at the lower portion of the piezoelectric actuator is 130° C., and this is higher than the guaranteed operating temperature range so that malfunction due to excessive temperature may occur. In other words, malfunction of this piezoelectric actuator may occur due to its temperature above the heatproof temperature for the piezoelectric actuator.

The present invention is not limited to the above-described embodiment, and can be changed without departing from the spirit of the present invention. For example, in the above-described embodiment, a pressure control type flow rate control device is described, however, the present invention is also applicable to a control type other than the pressure control type, for example, a thermal type flow rate control device (so-called mass flow controller, MFC) using a thermal sensor. In the above-described embodiment, a fluid control device including a resilient self-restoring metal diaphragm valve element is described, however, it would be evident to a person skilled in the art that the present invention is also applicable to a valve element other than a metal diaphragm.

DESCRIPTION OF REFERENCE NUMERALS

1*b* Fluid passage
10 Piezoelectric actuator
23A Support cylinder
23U First cylinder portion
23L Second cylinder portion
18 Elastic member
40 Radiation spacer

The invention claimed is:

1. A piezoelectrically driven valve comprising:
   (a) a valve element disposed to open and close a fluid passage;
   (b) a piezoelectric actuator disposed to drive the valve element for opening/closing the fluid passage by utilizing extension of a piezoelectric element of the piezoelectric actuator;
   (c) a radiation spacer that lifts and supports the piezoelectric actuator away from the fluid passage, and the radiation spacer radiates heat that is transferred from fluid flowing in the fluid passage to the piezoelectric actuator;
   (d) a support cylinder that houses and supports both of the piezoelectric actuator and the radiation spacer, wherein the support cylinder is made of a material with the same thermal expansion coefficient as that of the radiation spacer;
   wherein the valve element comprises:
      i. a resilient self-restoring metal diaphragm;
      ii. an elastic member that biases the support cylinder to make the valve element close the fluid passage; and
      iii. a support portion that passes through a side wall of the support cylinder and extends to a lower portion of the radiation spacer, and the support portion supports the radiation spacer so as to lift the support cylinder against an elastic force of the elastic member to make the valve element open the fluid passage when the piezoelectric actuator extends, wherein the support cylinder is supported movably up and down on a split base.

2. The piezoelectrically driven valve according to claim 1, wherein the support cylinder includes a first cylinder portion that houses the piezoelectric actuator and a second cylinder portion that houses the radiation spacer, and the support cylinder is configured so that the first cylinder portion and the second cylinder portion are joinable to each other so as to form a common housing space, and the second cylinder portion is made of a material with the same thermal expansion coefficient as that of the radiation spacer.

3. The piezoelectrically driven valve according to claim 1, wherein the radiation spacer comprises Invar material.

4. The piezoelectrically driven valve according to claim 1, wherein the radiation spacer has the same shape and size as the piezoelectric actuator.

5. The piezoelectrically driven valve according to claim 1, wherein a length between a lower end portion and an upper end portion of the radiation spacer is set so that a temperature at the upper end portion is not higher than a heatproof temperature of the piezoelectric actuator due to radiation of heat by the radiation spacer during transfer of heat by the radiation spacer from the fluid flowing in the fluid passage from the lower end portion to the upper end portion of the radiation spacer.

6. A piezoelectrically driven flow rate control device comprising:
   the piezoelectrically driven valve according to claim 1.

7. The piezoelectrically driven flow rate control device according to claim 6, further comprising:
   an orifice interposed in the fluid passage on a downstream side of the valve element;
   a pressure sensor disposed in the fluid passage between the orifice and the valve element; and
   a control unit that operates to control the piezoelectric actuator based on a detected value detected by the pressure sensor.

8. The piezoelectrically driven flow rate control device according to claim 6, wherein the piezoelectrically driven flow rate control device controls the piezoelectric actuator based on a detected value detected by a thermal type flow sensor disposed on an upstream side of the valve element.

9. A piezoelectrically driven flow rate control device comprising:
   the piezoelectrically driven valve according to claim 2.

10. A piezoelectrically driven flow rate control device comprising:
   the piezoelectrically driven valve according to claim 1.

11. A piezoelectrically driven flow rate control device comprising:
   the piezoelectrically driven valve according to claim 3.

12. A piezoelectrically driven flow rate control device comprising:
   the piezoelectrically driven valve according to claim 4.

13. A piezoelectrically driven flow rate control device comprising:
   the piezoelectrically driven valve according to claim 5.

* * * * *